(12) United States Patent
Dolenti

(10) Patent No.: US 11,060,633 B2
(45) Date of Patent: Jul. 13, 2021

(54) METHODS OF DETERMINING A FORCE ASSOCIATE WITH A VALVE SYSTEM

(71) Applicant: Flowserve Management Company, Irving, TX (US)

(72) Inventor: William T. Dolenti, Lynchburg, VA (US)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 16/546,199

(22) Filed: Aug. 20, 2019

(65) Prior Publication Data

US 2020/0049276 A1 Feb. 13, 2020

Related U.S. Application Data

(62) Division of application No. 15/511,627, filed as application No. PCT/US2014/055683 on Sep. 15, 2014, now Pat. No. 10,385,991.

(51) Int. Cl.
*F16K 37/00* (2006.01)
*F16K 31/53* (2006.01)
(Continued)

(52) U.S. Cl.
CPC .......... *F16K 37/0041* (2013.01); *F16K 31/05* (2013.01); *F16K 31/53* (2013.01); *F16K 37/0083* (2013.01); *G01D 5/202* (2013.01)

(58) Field of Classification Search
CPC ..... F16H 2057/0221; F16H 2057/0222; F16H 2057/0213; Y10T 137/7194;
(Continued)

(56) References Cited

U.S. PATENT DOCUMENTS 4,042,876 A ‡ 8/1977 Visioli, Jr. ............. G01D 5/202
324/20
4,406,999 A ‡ 9/1983 Ward ...................... G01D 5/202
324/20
(Continued)

FOREIGN PATENT DOCUMENTS

CN 201884758 U ‡ 6/2011
CN 201884758 U 6/2011
(Continued)

OTHER PUBLICATIONS

Extended European Search Report from European Application No. 14902198.2, dated Jan. 25, 2018, 12 pages.‡
(Continued)

*Primary Examiner* — Reinaldo Sanchez-Medina
*Assistant Examiner* — Nicole Gardner
(74) *Attorney, Agent, or Firm* — Phillips Winchester

(57) ABSTRACT

Methods of determining a force associated with a valve system include wirelessly sensing a position of at least a portion of the conductive material with the at least one inductance-to-digital converter (LDC) sensor and determining a force applied to a portion of the valve system based at least partially on the position of the at least a portion of the conductive material. Valve systems include at least one component comprising a conductive material and at least one inductance-to-digital converter (LDC) configured to wirelessly sense a position of at least a portion of the conductive material. The valve system is configured to determine at least one force applied to a portion of the valve system based at least partially on the position of the at least a portion of the conductive material.

19 Claims, 9 Drawing Sheets

(51) Int. Cl.
*F16K 31/05* (2006.01)
*G01D 5/20* (2006.01)

(58) Field of Classification Search
CPC ......... Y10T 137/7905; Y10T 137/7906; Y10T 137/86477; Y10T 137/87756; F16K 31/535; F16K 31/055
USPC ................................... 324/207.15; 251/249.5
See application file for complete search history.

(56) References Cited

U.S. PATENT DOCUMENTS

| | | | | |
|---|---|---|---|---|
| 5,140,263 | A ‡ | 8/1992 | Leon .................. | G01B 7/14 116/27 |
| 5,471,138 | A ‡ | 11/1995 | Glass, III .......... | G01D 5/2013 137/55 |
| 5,609,183 | A ‡ | 3/1997 | Parker ................ | F16K 1/22 137/55 |
| 5,742,161 | A ‡ | 4/1998 | Karte ................. | G01B 7/003 324/207.12 |
| 7,516,656 | B2 ‡ | 4/2009 | Nogami ............ | F16K 37/0083 73/168 |
| 7,845,616 | B2 * | 12/2010 | Hatsuzawa ........ | F02D 9/105 251/129.11 |
| 8,424,838 | B2 ‡ | 4/2013 | Dolenti ............. | F03G 1/02 251/12 |
| 8,608,128 | B2 ‡ | 12/2013 | Dolenti ............. | F16K 37/0083 251/12 |
| 2010/0133828 | A1 ‡ | 6/2010 | Stegemann ........ | F03D 7/0224 290/44 |
| 2013/0314239 | A1 ‡ | 11/2013 | Clark ................ | F16K 37/0041 340/68 |

FOREIGN PATENT DOCUMENTS

| | | | | |
|---|---|---|---|---|
| CN | 103343831 | A ‡ | 10/2013 | |
| CN | 103343831 | A | 10/2013 | |
| DE | 3713562 | A1 ‡ | 11/1988 | ......... G01D 5/2216 |
| DE | 3713562 | A1 | 11/1988 | |
| WO | 2014077849 | A1 | 5/2014 | |
| WO | WO-2014077849 | A1 ‡ | 5/2014 | |
| WO | 2016043710 | A1 | 3/2016 | |
| WO | WO-2016043710 | A1 ‡ | 3/2016 | ............. F16K 31/53 |

OTHER PUBLICATIONS

International Preliminary Report on Patentability from International Application No. PCT/US2014/055683, dated Mar. 30, 2017, 10 pages.‡
First Office Action from Chinese Application No. 201480083414.3, dated Jun. 5, 2018, 17 pages.‡
First Examination Report from Australian Application No. 2014406531, dated Sep. 13, 2018, 4 pages.‡
Search Report and Written Opinion from International Application No. PCT/US2014/055683, dated Jun. 16, 2015, 13 pages.‡

\* cited by examiner
‡ imported from a related application

METHODS OF DETERMINING A FORCE ASSOCIATE WITH A VALVE SYSTEM

CROSS-REFERENCE TO RELATED APPLICATIONS

This application is a divisional of U.S. patent application Ser. No. 15/511,627, filed Mar. 15, 2017, which claims the benefit of national phase entry under 35 U.S.C. § 371 of International Patent Application PCT/US2014/055683, filed Sep. 15, 2014, designating the United States of America and published in English as International Patent Publication WO2016/043710 A1 on Mar. 24, 2016, the disclosure of which is hereby incorporated herein in its entirety by this reference.

TECHNICAL FIELD

The present disclosure relates generally to methods of determining a force associated with valve systems including one or more of a valve and a valve actuator, and more particularly, to having sensors utilized to detect at least one force applied to one or more components of a valve system.

BACKGROUND

Valves include devices for both liquids and gases. Valve actuators for moving valve elements within valves may be mechanically operated. Valve actuators are used to operate valves and are manufactured in numerous shapes, sizes, forms, and have a wide variety of utilities. Valve actuators may be manually driven, electrically driven, operated by fluid pressure in which the shaft is connected directly or indirectly to a fluid operated piston, or other hydraulic systems. For example, the valve actuator may be manually driven, operated by fluid pressure in which the shaft is connected directly or indirectly to a fluid operated piston, or be driven by an electro-hydraulic or electro-fluid means. Conventional valve actuators comprise an electrically driven input shaft, which may be rotatable at relatively high speeds with relatively low torque. The input shaft may, through reducing gears such as a worm gear or a helical screw thread and nut, rotate a relatively high torque, low speed output shaft.

Actuators are often sized such that they can provide more torque than necessary to fully seat a given valve. It may be desirable to determine the torque generated by the output shaft or drive sleeve of a valve actuator. For example, when a valve is fully closed and seated, the torque required to open the valve may be considerably higher. Consistently monitoring the torque may indicate if a valve is wearing out or sticking. Trending patterns in the torque measurements may enable predictive maintenance.

Actuators need to control or limit the amount of torque that can be applied to the load in a manner that is appropriate for various operating modes in a given application. Older mechanical technologies typically use complex mechanical systems to monitor the torque applied to a portion of the valve being actuated, such as the valve shaft. If a torque threshold is exceeded, actuation of the valve is ceased.

Other mechanical and non-mechanical torque sensors may be used with rotary components; however, the torque sensors would need to be placed on a torsion element in the drive train of the valve actuator. The drive train would be spinning during operation. Therefore, retrieval of the torque information from the spinning sensor may be difficult.

DISCLOSURE

In some embodiments, the present disclosure includes a valve system including at least one component comprising at least one conductive material and at least one inductance-to-digital converter (LDC) sensor separated from the at least one conductive material of the at least one component. The inductance-to-digital converter (LDC) sensor comprises an inductor and is configured to wirelessly sense a position of at least a portion of the conductive material. The valve system is configured to determine at least one force applied to a portion of the valve system based at least partially on the position of the at least a portion of the conductive material sensed with the at least one inductance-to-digital converter (LDC) sensor.

In yet additional embodiments, the present disclosure includes a valve actuator including a worm shaft comprising a worm and at least one conductive material, a biasing element biasing the worm shaft in a first position, a motor for rotating the worm shaft, a worm gear configured to engage with and drive a valve stem of a valve in order to move a valve element of the valve between an open and a closed position, and at least one inductance-to-digital converter (LDC) sensor separated from the at least one conductive material of the worm shaft. The inductance-to-digital converter (LDC) sensor comprises an inductor and is configured to wirelessly sense displacement of the conductive material. The valve system is configured to determine an output torque associated with the valve actuator based on the displacement of the conductive material sensed with the at least one inductance-to-digital converter (LDC) sensor and a known stiffness of the biasing element.

In yet additional embodiments, the present disclosure includes a method of determining a force associated with a valve system. The method includes positioning at least one inductance-to-digital converter (LDC) sensor proximate a conductive material of a component of the valve system, wirelessly sensing a position of at least a portion of the conductive material with the at least one inductance-to-digital converter (LDC) sensor, and determining a force associated with a portion of the valve system based at least partially on the position of the at least a portion of the conductive material sensed with the at least one inductance-to-digital converter (LDC) sensor.

The features, advantages, and various aspects of the present disclosure will be apparent to those skilled in the art from a consideration of the following detailed description taken in combination with the accompanying drawings.

BRIEF DESCRIPTION OF THE DRAWINGS

While the specification concludes with claims particularly pointing out and distinctly claiming that which is regarded as the present disclosure, the advantages of this disclosure can be more readily ascertained from the following description of the disclosure when read in conjunction with the accompanying drawings.

DETAILED DESCRIPTION

The methods, devices, apparatus, and systems of the present disclosure include sensors for use with valve systems including one or more of a valve and a valve actuator. For example, such sensors may be utilized to detect at least one a force applied to one or more components of a valve system.

Figure 1:
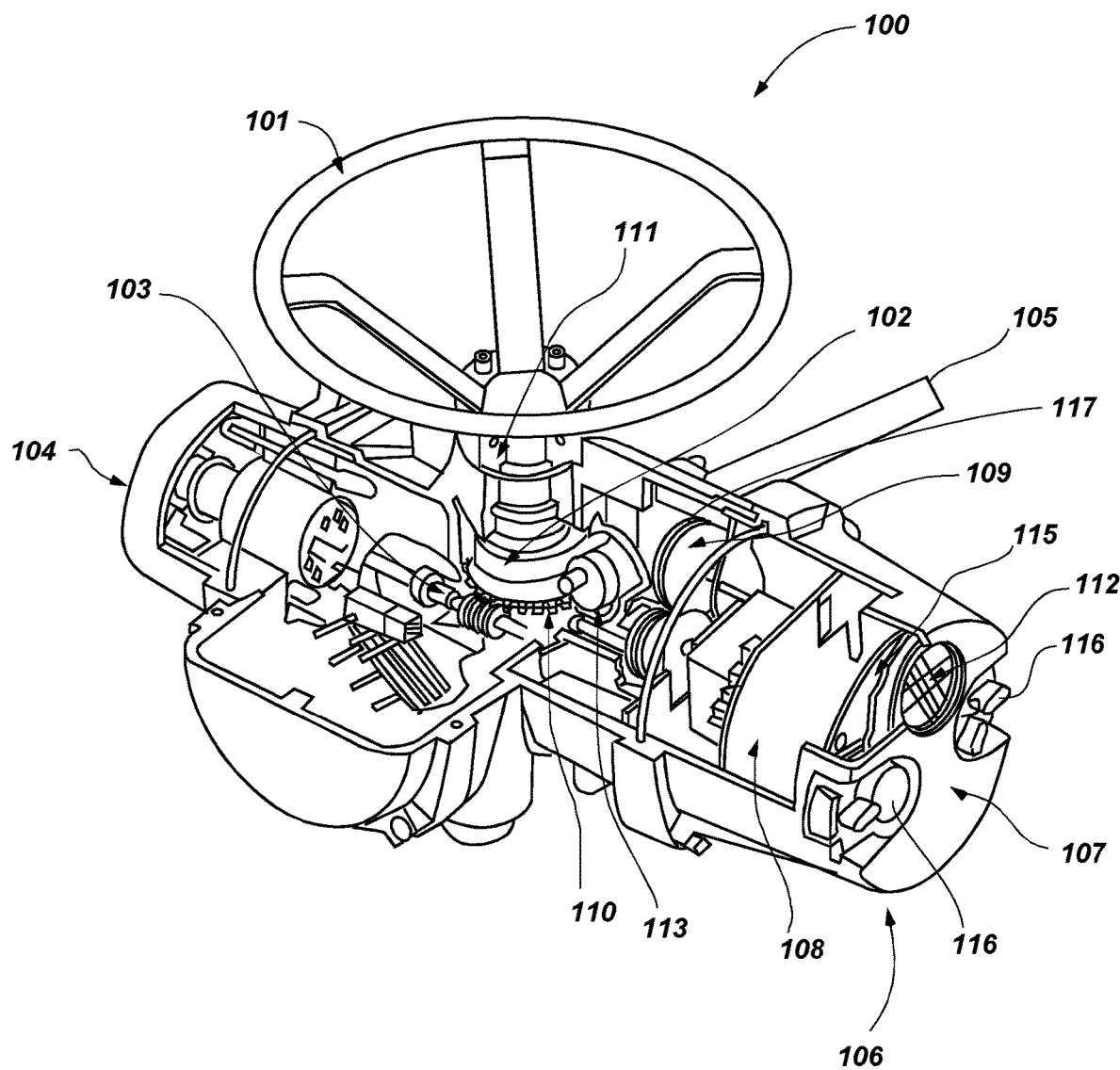
FIG. 1 is a cut-away view of an electrically driven valve actuator.

FIG. 1 illustrates an electrically driven valve actuator 100. FIG. 1 illustrates just one version of an electrically driven valve actuator and is not intended to limit the applicability of the disclosure to any electrically driven or other valve actuator (e.g., a pneumatic actuator, a hydraulic actuator, etc.). Valve actuator 100 includes electric motor 104 coupled to worm shaft 103. Handwheel 101 is connected to handwheel adapter 111. Handwheel adapter 111 is connected to drive sleeve 102. Drive sleeve 102 is connected to valve stem nut (not shown). Worm gear 110 mates with worm shaft 103. Worm gear 110 is also coupled to a valve stem nut, which is able to drive the valve stem of a valve. In FIG. 1, valve actuator 100 is not shown attached to a valve. Operation of either electric motor 104 or handwheel 101 raises or lowers a valve stem. The valve stem is able to travel up and down through the center of handwheel 101. The valve stem may also rotate and either operate a nut in the valve which can either open or close the valve or can directly rotate a valve to an open or close position (e.g., as in a butterfly, vane, or ball valve).

Valve actuator 100 may include any drive train, hardware, devices, electronics, and/or software utilized in operating a valve. Valve actuator 100 may be designed for any type of valve element within a valve, including for example, linear, quarter-turn rotary, multi-turn rotary, ball, plug, gate, butterfly, and diaphragm valve elements. The components of valve actuator 100 may be arranged in any fashion. Handwheel 101 may be oriented to the side of valve actuator 100, as is known in the art.

The drive train encompasses any prime mover, any manual operation mechanism, any disengagement or isolation mechanisms, braking mechanisms, any speed modulation mechanisms, and the mechanisms for attachment to a valve. A drive train may also exclude any of the above elements or also include additional elements. For purposes of illustration only, FIG. 1 shows electric motor 104 as the prime mover and handwheel 101 as the manual operation mechanism. Often, a clutch mechanism will be included so that operation of either electric motor 104 or handwheel 101 does not result in operation of the other. By way of example, a lever 105 and a declutch mechanism 113 can be provided as the disengagement or isolation mechanisms. Numerous clutch and engagement mechanism are known in the art. Declutch mechanism 113 may be designed to engage or disengage any portion of the drive train of valve actuator 100.

In FIG. 1, the braking mechanism and speed modulation mechanisms are both incorporated in worm shaft 103 and worm gear 110. Instead of, or in addition to, worm gear 110 and worm shaft 103, other gear types or no gears may be used in valve actuator 100. Gear types for valve actuators are often selected based upon the amount of speed reduction, if any, between electric motor 104 and valve stem nut. Hereinafter, when referring to the gears of the drive train of a valve actuator, the example of a worm gear and a worm shaft are primarily utilized. However, it should be understood that the discussion may be applied to any gear. If a gear is not present in the valve actuator, then output mechanism of any applicable prime mover may also suffice.

In the example of FIG. 1, the mechanisms for attachment to a valve may be a valve stem nut and associated supporting structures, as are known in the art. However, any mechanism for attachment known in the art may be utilized. The term "valve" as used herein encompasses the most generic uses of the term as used in the art, including the definition of a device that at least partially controls the flow of a liquid, gas, and/or solid. Electric motor 104 may be any electrically driven prime mover capable of operating a valve actuator.

FIG. 1 also illustrates an exemplary control system 106 for the valve actuator 100. For example, the control system 106 may include a control module 108 for controlling electric motor 104, and depicts circuit board 115 for receiving inputs from human-machine interface (e.g., control panel 107) and for sending outputs to indicator 112. The control panel 107 may include one or more input devices 116 (e.g., knobs and/or switches) accessible to a user for operation of the control system 106 of the valve actuator 100.

In this particular example, indicator 112 is illustrated as a liquid crystal display (LCD). One or more indicators 112 may be present. A few non-limiting examples of indicators include light-emitting diode lights (LED) and displays, filament lights, and dials.

The control system 106 may also include an encoder 109, which is depicted as a multi-wheel absolute encoder in FIG. 1. The encoder may include one or more wheels 117 (e.g., rotating toothed gears). In other embodiments, the encoder 109 may comprise a different type of encoder such as, for example, a single wheel absolute encoder, an incremental encoder, etc.

In some embodiments, the human-machine interface may be part of the control system 106. In other embodiments, the human-machine interface may be formed separate from and remotely communicate with the control system 106.

Figure 2:
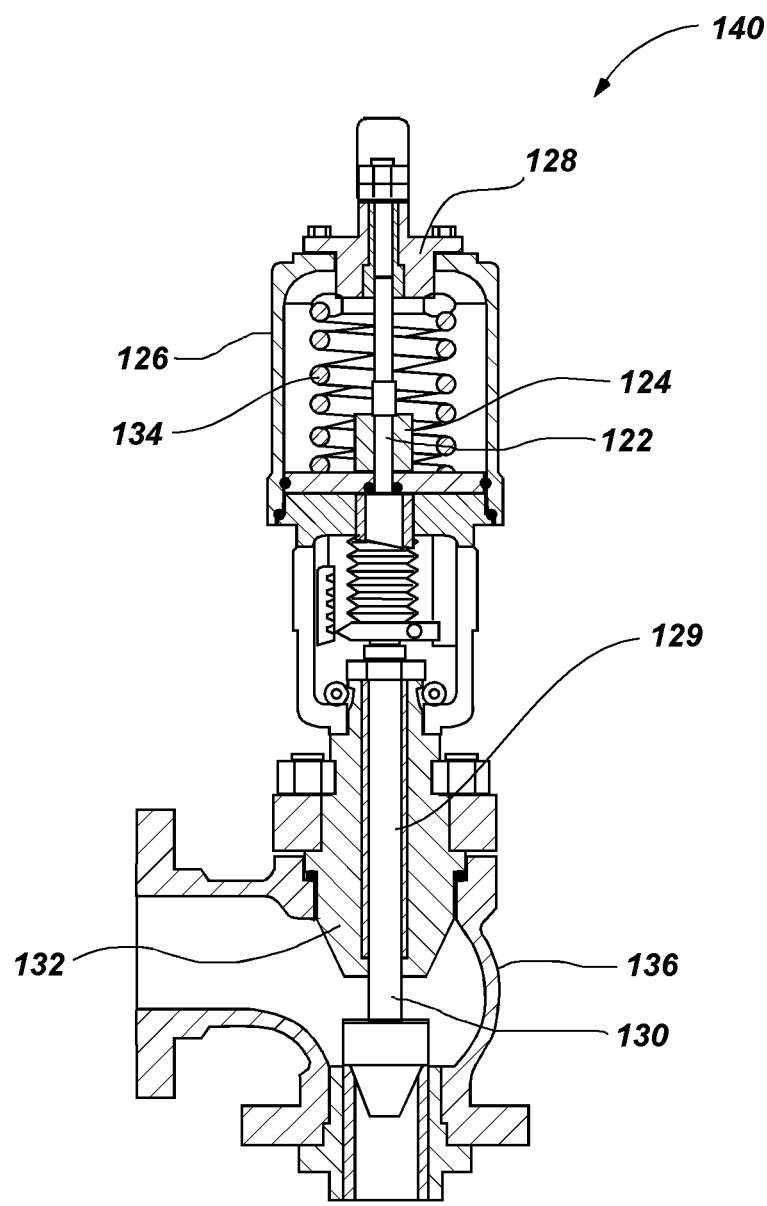
FIG. 2 is cross-sectional view of a pneumatically driven valve actuator.

The present disclosure is not limited to any particular valve actuator and may be applied to any valve actuator. FIG. 2 illustrates a pneumatically driven valve actuator, valve actuator 140. Valve actuator 140 is shown mated to valve 136 and actuator stem 122 is coupled to a valve stem 129 and plug 130. The movement of actuator stem 122 results in corresponding movement of the valve stem 129 and plug 130, which governs the operation of valve 136. Valve 136 may be a globe, gate, ball, butterfly, plug, diaphragm, or any other type of valve operable by an actuator. Actuator stem 122 and plug 130 are illustrated for a representative globe valve. However, it should be understood that either component may be modified depending upon the type of valve present. Additionally, when the phrase "drive train" is used hereinafter, the phrase encompasses the drive components of valve actuator 140, such as actuator stem 122.

Valve actuator 140 may also include a control system similar to the control system 106 as shown and described above with reference to FIG. 1.

Embodiments of the present disclosure include sensors utilizing inductive sensing (e.g., magnet-free inductive sensing, such as inductance-to-digital converter sensors that operate without the use of magnets (LDC sensors) even though the sensors may still produce a magnetic field) for use with one or more components of a valve system such as, for example, valve actuators, encoders (e.g., rotary encoders) for valve systems, control systems for valve actuators (e.g., internal or external (e.g., remote) control system of a valve actuator). Such LDC sensing may provide contactless (e.g., wireless), magnet-free sensors that may be relatively more resilient in harsh environments where such LDC sensing may be less susceptible to interferences (e.g., foreign contaminants) between the sensors and the object being sensed. Further, such LDC sensing enables one or more conductive targets on movable components (e.g., translating and/or rotating components) to be sensed by one or more stationary LDC sensors.

Such LDC sensors operate by utilizing an inductor (e.g., a coil, a wound wire, a coil on a printed circuit board (PBC), a spring, etc.) to detect a conductive material (e.g., metal, foil, conductive ink, etc.). By measuring a property of the conductive material (e.g., the inductance and/or the eddy currents of the conductive material), various characteristics of the conductive material may be determined. For example, an alternating current (AC) current flowing through the coil will generate an AC magnetic field. As the conductive material is brought into the vicinity of the coil, this magnetic field will induce circulating currents (e.g., eddy currents) on the surface of the conductive material. These eddy currents are a function of the distance, size and shape (e.g., area, volume), and composition of the conductive material and generate their own magnetic field, which opposes the original field generated by the coil. The inductive coupling between the coil and the eddy currents of the conductive material depends on distance and shape. Thus, the resistance and inductance of the eddy currents of the conductive material shows up as a distant dependent resistive and inductive component on the coil.

Such an LDC sensor can detect movement or other characteristics of the conductive material (e.g., rotation, translation, linear position, angular position, fluid flow, speed, angular velocity, linear velocity, compression, elongation, torque, vibration, composition, stress, strain, defects, or combinations thereof) and/or changes in the conductive material (e.g., a dimension of the conductive material such as length, width, thickness, etc.). The LDC sensor relays such values detected from the conductive material to an inductance to digital converter (e.g., available from Texas Instruments Incorporated of Dallas, Tex.) to output a signal corresponding to the valves (e.g., sensed position) detected from the conductive material.

Figure 3:
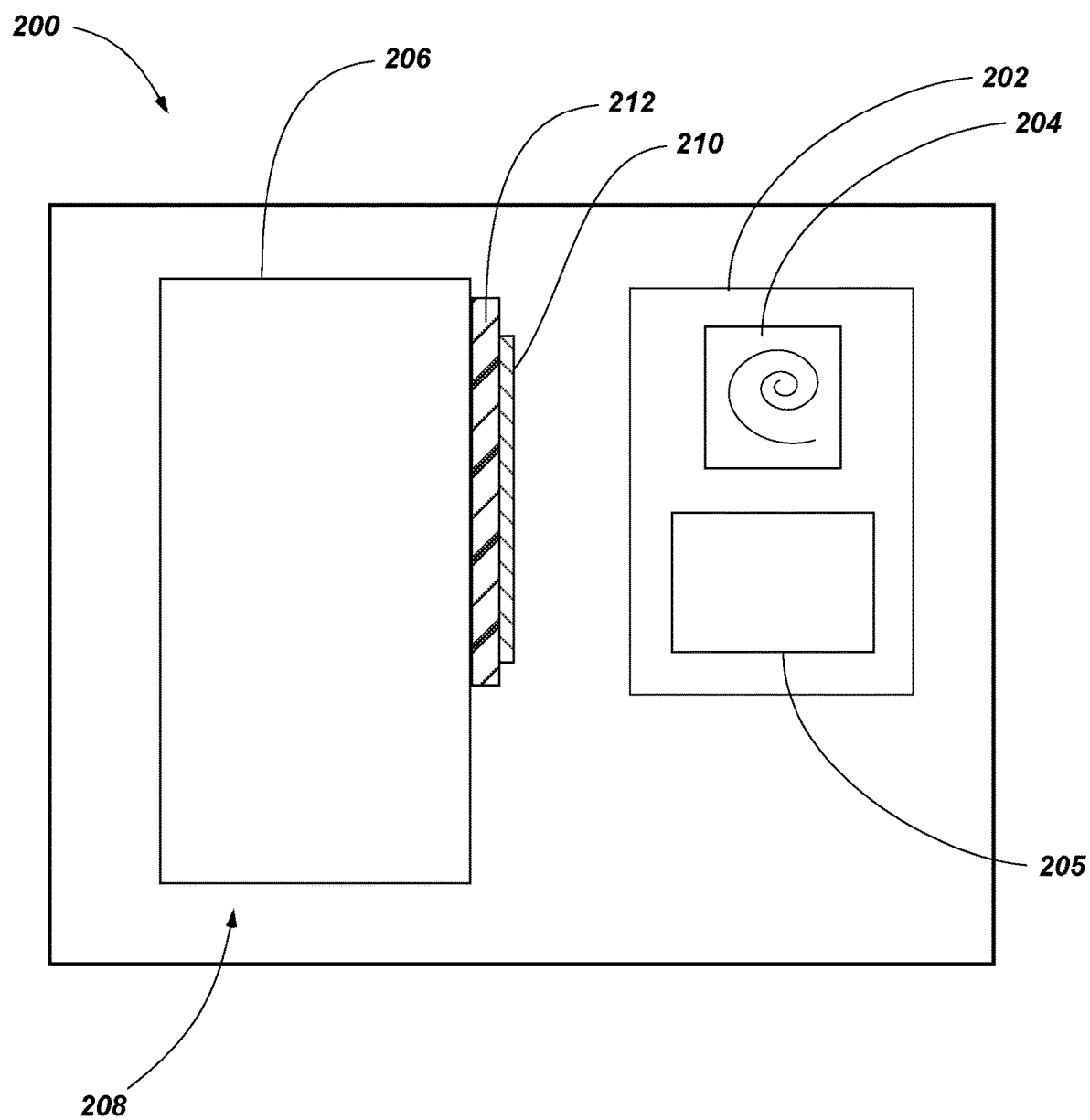
FIG. 3 is a schematic view of valve system including one or more inductance-to-digital converter (LDC) sensors utilized to sense one or more characteristics of one or more components of a valve assembly in accordance with an embodiment of the present disclosure.

FIG. 3 is a schematic view of valve system 200 including one or more LDC sensors 202 utilized to sense one or more characteristics (e.g., position) of one or more components 206 of a valve assembly 208. The valve system 200 may then be utilized the sensed value to determine another characteristic of one or more components 206 of a valve assembly 208 (e.g., a force associated with of one or more components 206 of the valve assembly 208).

In some embodiments, the valve assembly 208 may comprise a valve actuator such as, for example, the valve actuators 100, 140 shown and described above with reference to FIGS. 1 and 2, respectively, and/or may include a valve assembly (e.g., valve 136).

In some embodiments, the one or more components 206 of the valve assembly 208 may comprise a shaft (e.g., a rotating and/or linear displacing shaft, such as, for example, the worm shaft 103 (FIG. 1), actuator stem 122 (FIG. 2), or the valve stem 129 (FIG. 2)). In some embodiments, the one or more components 206 of the valve assembly 208 may comprise input devices, such as the input devices 116 of control system 106 (FIG. 2). In some embodiments, the one or more components 206 of the valve assembly 208 may comprise wheels of an encoder, such as, for example, the rotary toothed wheels 117 of encoder 109 (FIG. 1).

As shown in the FIG. 3, the LDC sensor 202 is positioned in proximity to the component 206 of the valve assembly 208 in order to sense one or more characteristics (e.g., position) of the component 206 of the valve assembly 208. In some embodiments, the component 206 of the valve assembly 208 may be formed of a conductive material (e.g., a ferrous metal) that may be detected by coil 204, which is driven by electronics 205 (e.g., a control system) that may power the coil 204 and sense a value of the coil 204 (e.g., resistance and/or inductance) in response to the position of the component 206 of the valve assembly 208. The component 206 of the valve assembly 208 may comprise a conductive material 210 (e.g., a conductive foil, conductive ink, a thin sheet of conducive material, etc.) that may be detected by coil 204. In some embodiments, the conductive material 210 may be applied (e.g., adhered) to a portion (e.g., an outer surface) of the component 206 of the valve assembly 208. In some embodiments, where the component 206 of the valve assembly 208 is also formed of a conductive material, an insulating material 212 may be positioned between the conductive material 210 and the component 206 of the valve assembly 208. In other embodiments, a conductive portion of the valve assembly 208 it may form the conductive material 210.

The conductive material 210 may be formed in any number of suitable shapes and/or thicknesses to identify one or more characteristics of the component 206 of the valve assembly 208. For example, the conductive material 210 may be formed as a linear strip where deformation (e.g., strain, compression, torsion) of the underlying component 206 of the valve assembly 208 will be present in the linear strip and detectable by the LDC sensor 202 (e.g., a necking or twisting of the linear strip). In some embodiments, various known values of shapes and/or thicknesses of the conductive material 210 (e.g., initial values) may be stored such that the values detected by the LDC sensor 202 may be compared at a known or expected value (e.g., a stored value and/or a value detected and/or determined using the same or a different conductive material with the same or different LDC sensors 202) to detect deviation (e.g., deformation) of the conducive material 210.

By way of further example, the conductive material 210 may be formed in any number of specific shapes and/or thicknesses (e.g., varying thicknesses) to detect one or more target characteristics (e.g., linear and/or angular position and related values) of the component 206 of the valve assembly 208, such as those shapes discussed below with reference to FIGS. 4 through 10 and 14 through 19.

Figure 4:
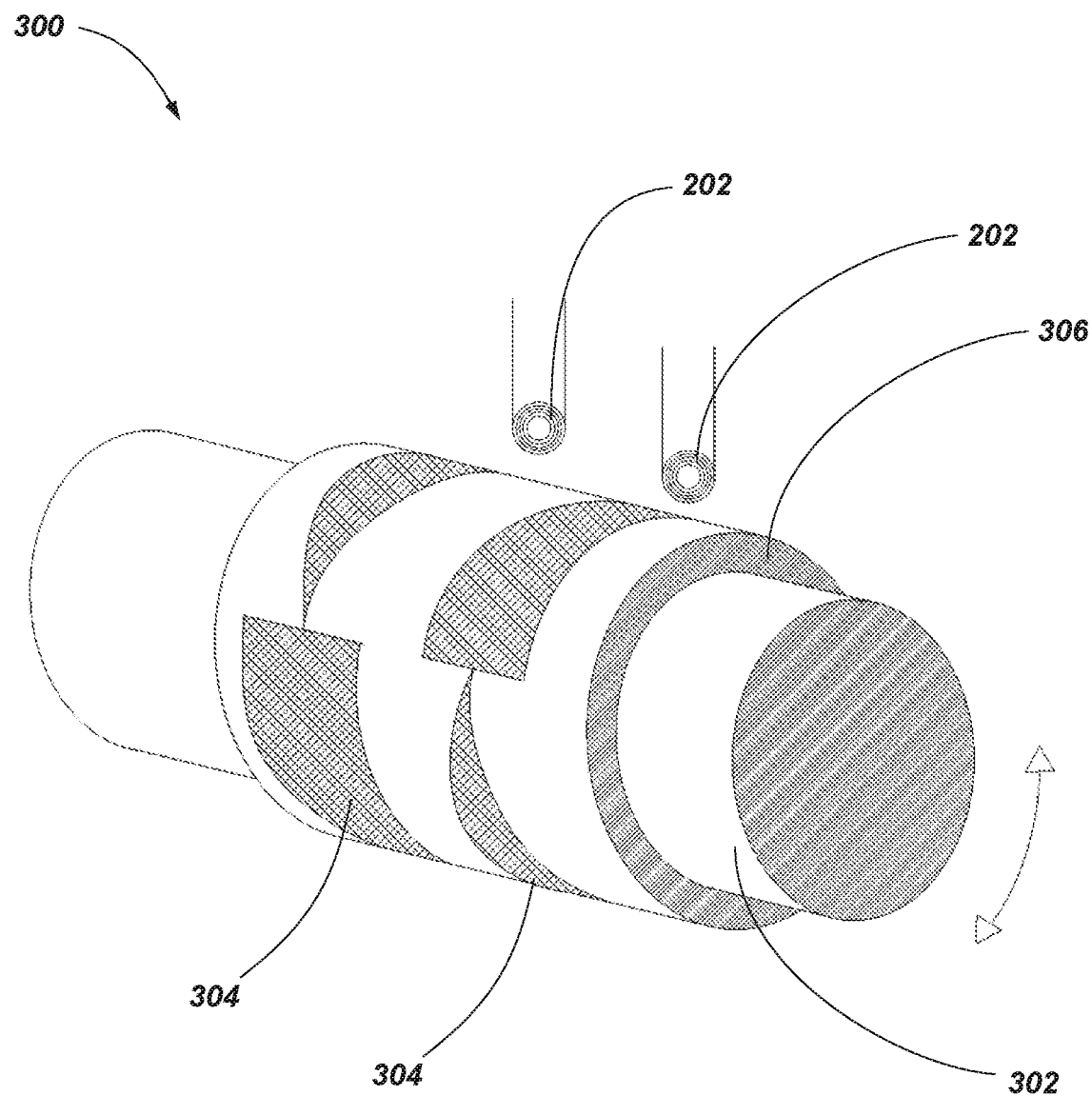
FIG. 4 is a partial cross-sectional perspective schematic view of a valve system including one or more LDC sensors utilized to sense one or more characteristics of a component of the valve system in accordance with an embodiment of the present disclosure.

FIG. 4 is a partial cross-sectional perspective schematic view of a valve system 300 including a component of the valve system 300 (e.g., a portion of a shaft 302) and one or more LDC sensors 202 utilized to sense one or more characteristics of the shaft 302. In some embodiments, the shaft 302 may be a rotating and/or linear displacing shaft, such as, for example, the worm shaft 103 (FIG. 1), actuator stem 122 (FIG. 2), or the valve stem 129 (FIG. 2)). As depicted, the shaft 302 may comprise one or more conductive materials 304. For example, the conductive material 304 may be applied to an outer surface (e.g., outer circumference) of the shaft 302 to detect at least one characteristic of the shaft 302 (e.g., angular position, linear position, angular velocity, torsion, etc.). As discussed above, where the shaft 302 is also formed of a conductive material, an insulative material 306 may be utilized to separate the conductive material 304 of the shaft 302 from the conductive material 304 applied to the shaft 302 to at least partially isolate the conductive material 304 of shaft from the LDC sensors 202. In other embodiments, at least a conductive portion of one or more components of a valve system may be formed to exhibit a shape similar to conductive material 300.

In order to determine the angular position of the shaft 302 (or to further determine a characteristic of the shaft 302 or another portion of the valve system based at least in part on the position of the shaft 302), the conductive material 304 may be designed to vary along the circumference of the shaft 302. For example, as depicted, the conductive material 304 may be formed as one or more triangular shapes that vary along the circumference of the shaft 302. In other embodiments, any other suitable shapes may be implemented. Such variation in the shape of the conductive material 304 varies the portion (e.g., area, volume) of conductive material 304 that is positioned proximate and sensed by LDC sensors 202 in order to correlate the data sensed by the LDC sensors 202 with known or expected positions of the shaft 302 and conductive material 304 utilizing the LDC sensors 202.

In some embodiments, two or more LDC sensors 202 may be utilized to determine the position of the shaft 302. For example, the conductive material 304 proximate to each LDC sensor 202 may be applied to the shaft 302 in an alternating manner (e.g., reverse, inverted, mirrored) such that each LDC sensor 202 may be utilized to determine the position of the shaft 302 and to validate the sensed data against the data from the other LDC sensor 202. In some embodiments, the two or more LDC sensors 202 may be utilized to compensate for or detect variations in or deviations from known or expected positions of the shaft 302 (e.g., to detect deformation in components of the valve system caused, for example, by torsion). For example, one LDC sensor 202 may be utilized to sense a known position of the shaft 302 that is then compared to an expected position for a second LDC sensor 202. Thus, if the sensed value for the second LDC sensor 202 deviates from the expected valve, the LDC sensors may indicate such a deviation (e.g., caused by a deformation in the shaft 302 or an error in the sensing system. In some embodiments, two or more LDC sensors 202 and two or more conductive materials 304 may be utilized to compensate for variability in the target position of the conductive materials 304. For example, if both conductive materials 304 are on a common rotating shaft, which has a common variation in radius (e.g., the shaft is not concentric around the spinning axis, i.e., run-out), then the signals from the conductive materials 304 can be averaged to remove the variation in the shaft from the signal.

While the conductive material 304 shown in FIG. 4 is configured primarily for measuring angular position and other related values (e.g., angular velocity), similar or other configurations of conductive material may be utilized to measure other characteristics of the shaft 302 (e.g., linear position and related values).

Figure 5:
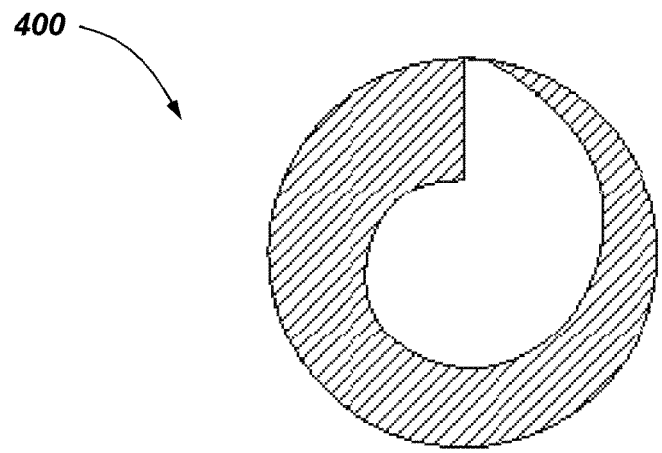
FIGS. 5 through 7 each show a conductive material for use with a valve system including one or more LDC sensors in accordance with an embodiment of the present disclosure.

FIG. 5 shows a conductive material 400 for use with a valve system (e.g., valve actuators 100, 140 and/or valve systems 200, 300 shown and described above with reference to FIGS. 1 through 4). The conductive material 400 may be applied to one or more components of a valve system (e.g., with an interposing insulative material, where applicable). In other embodiments, at least a conductive portion of one or more components of a valve system may be formed to exhibit a shape similar to conductive material 400.

As depicted, conductive material 400 may be useful in monitoring, in unison with LDC sensors 202 (FIG. 3), the angular position and/or related values (e.g., angular velocity) of rotating component. For example, conductive material 400 may be applied or otherwise positioned on an axial end of a rotating component proximate one or more LDC sensors 202 (FIG. 3) to monitor the rotational positioning of the component with the conductive material 400. In some embodiments, the conductive material 400 may be positioned on (e.g., applied to, formed on) a worm shaft 103 (FIG. 1), an actuator stem 122 (FIG. 2), a valve stem 129 (FIG. 2)), input devices 116 (e.g., knobs) of a control system 106 (FIG. 2), and/or rotary wheels 117 of an encoder 109 (FIG. 1).

Figure 6:
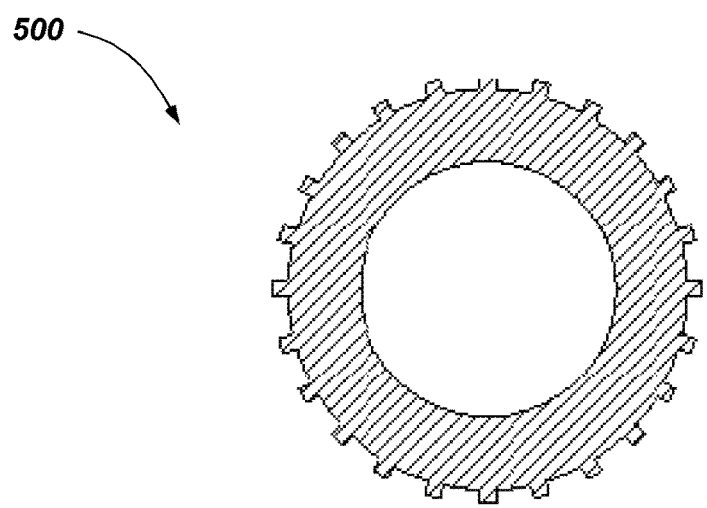

FIG. 6 shows another conductive material (e.g., a conductive wheel 500) for use with a valve system (e.g., valve actuators 100, 140 and/or valve systems 200, 300 shown and described above with reference to FIGS. 1 through 4). The conductive material may be applied to one or more components of a valve system (e.g., with an interposing insulative material, where applicable). As depicted, the component of the valve system itself (e.g., the conductive wheel 500 formed as, for example, a rotary-toothed wheel) may form the conductive material. In other words, the conductive material is formed with the conductive wheel 500 (e.g., a gear). In other embodiments, conductive material may be applied to a rotatory-toothed wheel to achieve the same or similar shape.

LDC sensors 202 (FIG. 3) may monitor the position (e.g., angular position) and/or related values (e.g., angular velocity, tooth frequency, tooth positioning, etc.) of at least a portion of the conductive wheel 500. For example, at least a portion of the conductive wheel 500 may be positioned proximate one or more LDC sensors 202 (FIG. 3) to monitor the positioning of the conductive wheel 500. In some embodiments, the LDC sensor 202 may be utilized to detect the position (e.g., proximity) of each gear tooth of the conductive wheel 500 in order to monitor the position of one or more portions the conductive wheel 500. In other embodiments, various shapes of conductive material may be applied radially inward of the gear teeth of the conductive wheel 500 to monitor the position of the conductive wheel 500.

In some embodiments, the conductive wheel 500 may comprise an encoder wheel of an encoder 109 (FIG. 1) and/or various other wheels of gears utilized in a valve system.

Figure 7:
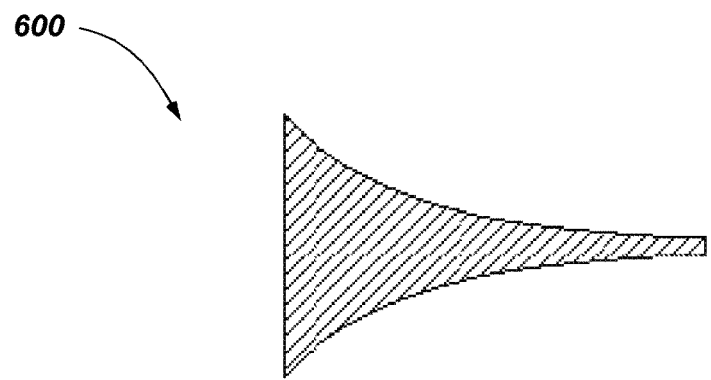

FIG. 7 shows a conductive material 600 for use with a valve system (e.g., valve actuators 100, 140 and/or valve systems 200, 300 shown and described above with reference to FIGS. 1 through 4). The conductive material 600 may be applied to one or more components of a valve system (e.g., with an interposing insulative material, where applicable). In other embodiments, at least a conductive portion of one or more components of a valve system may be formed to exhibit a shape similar to conductive material 600.

As depicted, conductive material 600 may be useful in monitoring, in unison with LDC sensors 202 (FIG. 3), the linear and/or angular position and/or related values (e.g., velocity) of a linearly moving component (e.g., a translating component). For example, conductive material 600 may be applied or otherwise positioned along a linear moving component (e.g., positioned along the component is a direction parallel to the intended direction of movement of the component) proximate one or more LDC sensors 202 (FIG. 3) to monitor the linear positioning (e.g., translation) of the component with the conductive material 600. In some embodiments, conductive material 600 may be positioned about a rotating component (e.g., radially positioned about a centerline of the component) to monitor angular positioning of the component.

In some embodiments, the conductive material 600 may be positioned along (e.g., applied to, formed on) a worm shaft 103 (FIG. 1), an actuator stem 122 (FIG. 2), a valve stem 129 (FIG. 2)), input devices 116 (e.g., switches or other linear moving input devices) of a control system 106 (FIG. 2), and/or rotary wheels 117 of an encoder 109 (FIG. 1).

Figure 8:
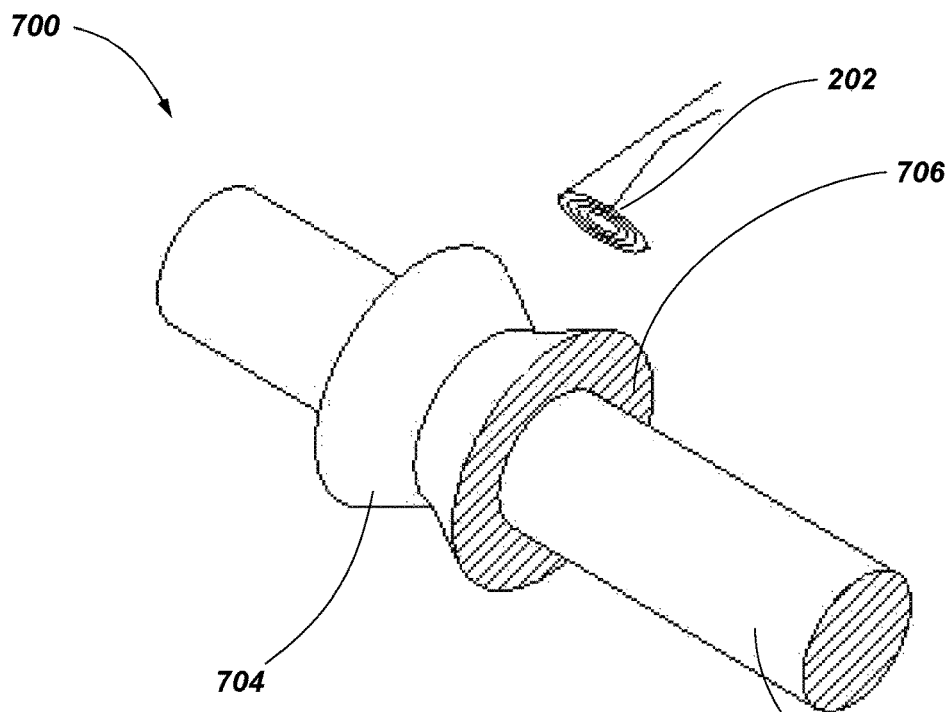
FIGS. 8 through 10 each show a partial cross-sectional perspective schematic view of a valve system including an LDC sensor utilized to sense one or more characteristics of a component of the valve system in accordance with an embodiment of the present disclosure.

FIG. 8 is a partial cross-sectional perspective schematic view of a valve system 700 including a component of the valve system 700 (e.g., a portion of a shaft 302) and one or more LDC sensors 202 utilized to sense one or more characteristics of the shaft 302. In some embodiments, the shaft 302 may be a rotating and/or linear displacing shaft, such as, for example, the worm shaft 103 (FIG. 1), actuator stem 122 (FIG. 2), or the valve stem 129 (FIG. 2)). As depicted, the shaft 302 may comprise one or more conductive materials 704. For example, the conductive material 704 may be applied to an outer surface (e.g., outer circumference) of the shaft 302 to detect at least one characteristic of the shaft 302 (e.g., linear position, linear or translational velocity, etc.). As discussed above, where the shaft 302 is also formed of a conductive material, an insulative material 706 may be utilized to separate the conductive material 304 of the shaft 302 from the conductive material 704 applied to the shaft 302 to at least partially isolate the conductive material 704 of shaft from the LDC sensors 202.

In order to determine the linear position of the shaft 302 (or to further determine a characteristic of the shaft 302 or another portion of the valve system based at least in part on the position of the shaft 302), the conductive material 704 may be designed to vary in thickness along the length of the shaft 302 (e.g., along a longitudinal axis or centerline of the shaft 302). For example, the conductive material 704 may be formed to exhibit a gradated thickness with one or more peaks 708 having an increased thickness in a radial direction of the shaft 302 separated by valleys 710 having a decreased thickness in a radial direction of the shaft 302 (e.g., two peaks 708 separated by a single valley 710). In other words, one or more portions of the conductive material 704 are formed to have a thickness greater than a thickness of one or more adjacent portions of the conductive material 704 with gradated thicknesses extending therebetween. Such a configuration may enable the sensor 202 to detect linear position (e.g., translation) of the shaft 302 as the shape (e.g., thickness) of the conductive material 704 varies the portion (e.g., area, volume) of conductive material 704 that is positioned proximate and sensed by LDC sensor 202 in order to correlate the data sensed by the LDC sensor 202 with known or expected positions of the shaft 302 and conductive material 704 utilizing the LDC sensors 202.

Figure 9:
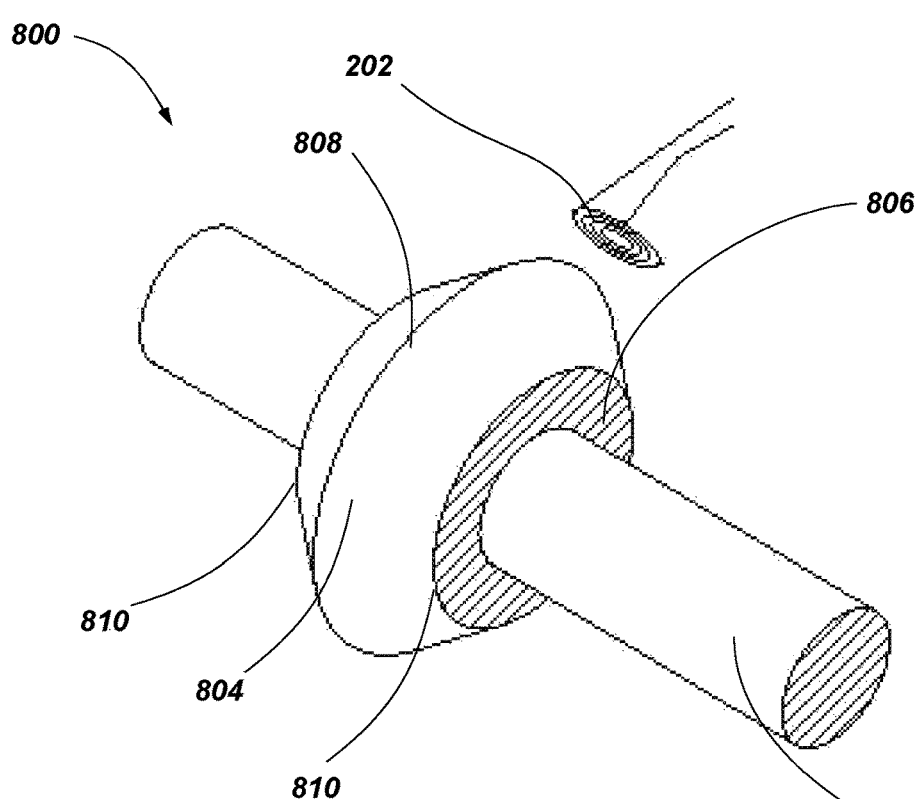

FIG. 9 is a partial cross-sectional perspective schematic view of a valve system 800 including a component of the valve system 800 (e.g., a portion of a shaft 302) and one or more LDC sensors 202 utilized to sense one or more characteristics of the shaft 302. As depicted, the shaft 302 may comprise one or more conductive materials 804. For example, the conductive material 804 may be applied to an outer surface (e.g., outer circumference) of the shaft 302 to detect at least one characteristic of the shaft 302 (e.g., linear position, linear or translational velocity, etc.). As discussed above, where the shaft 302 is also formed of a conductive material, an insulative material 806 may be utilized to separate the conductive material 304 of the shaft 302 from the conductive material 804 applied to the shaft 302 to at least partially isolate the conductive material 804 of shaft 302 from the LDC sensors 202.

In order to determine the linear position of the shaft 302 (or to further determine a characteristic of the shaft 302 or another portion of the valve system based at least in part on the position of the shaft 302), the conductive material 804 may be designed to vary in thickness along the length of the shaft 302 (e.g., along a longitudinal axis or centerline of the shaft 302). For example, the conductive material 804 may be formed to exhibit a gradated thickness with one or more peaks 808 having an increased thickness in a radial direction of the shaft 302 alternating with valleys 810 having a decreased thickness in a radial direction of the shaft 302 (e.g., one peak 808 having valleys 810 on either side of the peak 810). In other words, one or more portions of the conductive material 804 are formed to have a thickness greater than a thickness of one or more adjacent portions of the conductive material 804 with gradated thicknesses extending therebetween. Such a configuration may enable the sensor 202 to detect linear position (e.g., translation) of the shaft 302 as the shape (e.g., thickness) of the conductive material 804 varies the portion (e.g., area, volume) of conductive material 804 that is positioned proximate and sensed by LDC sensor 202 in order to correlate the data sensed by the LDC sensor 202 with known or expected positions of the shaft 302 and portions of the conductive material 804 utilizing the LDC sensors 202.

Figure 10:
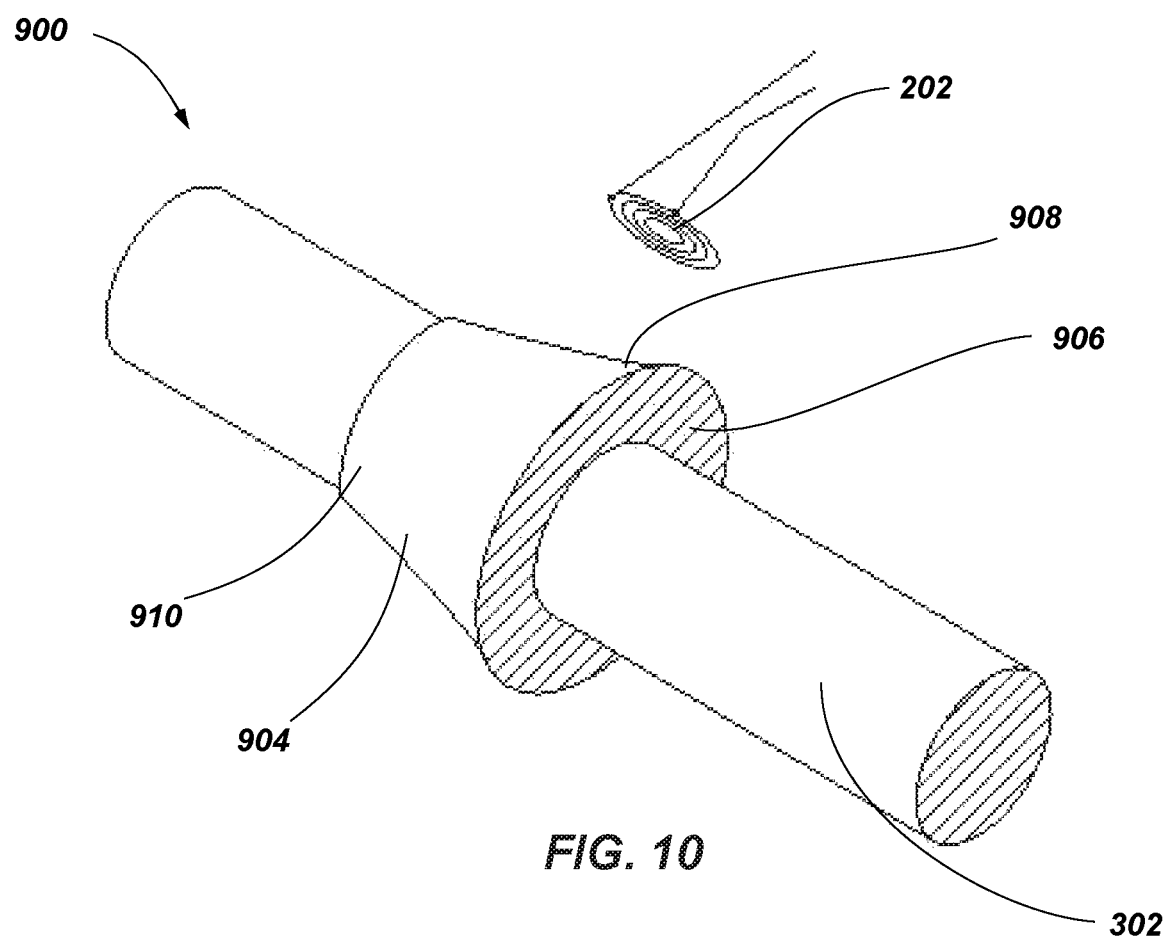

FIG. 10 is a partial cross-sectional perspective schematic view of a valve system 900 including a component of the valve system 900 (e.g., a portion of a shaft 302) and one or more LDC sensors 202 utilized to sense one or more characteristics of the shaft 302. As depicted, the shaft 302 may comprise one or more conductive materials 904. For example, the conductive material 904 may be applied to an outer surface (e.g., outer circumference) of the shaft 302 to detect at least one characteristic of the shaft 302 (e.g., linear position, linear or translational velocity, etc.). As discussed above, where the shaft 302 is also formed of a conductive material, an insulative material 906 may be utilized to separate the conductive material 304 of the shaft 302 from the conductive material 904 applied to the shaft 302 to at least partially isolate the conductive material 904 of shaft from the LDC sensors 202.

In order to determine the linear position of the shaft 302 (or to further determine a characteristic of the shaft 302 or another portion of the valve system based at least in part on the position of the shaft 302), the conductive material 904 may be designed to vary in thickness along the length of the shaft 302 (e.g., along a longitudinal axis or centerline of the shaft 302). For example, the conductive material 904 may be formed to exhibit a gradated thickness with one or more peaks 908 having an increased thickness in a radial direction of the shaft 302 alternating with valleys 910 having a decreased thickness in a radial direction of the shaft 302 (e.g., a gradated thickness extending between one peak 908 and one valley 910). In other words, one or more portions of the conductive material 904 are formed to have a thickness greater than a thickness of one or more adjacent portions of the conductive material 904 with gradated thicknesses extending therebetween. Such a configuration may enable the sensor 202 to detect linear position (e.g., translation) of the shaft 302 as the shape (e.g., thickness) of the conductive material 904 varies the portion (e.g., area, volume) of conductive material 904 that is positioned proximate and sensed by LDC sensor 202 in order to correlate the data sensed by the LDC sensor 202 with known or expected positions of the shaft 302 and portions of the conductive material 904 utilizing the LDC sensors 202.

Figure 11:
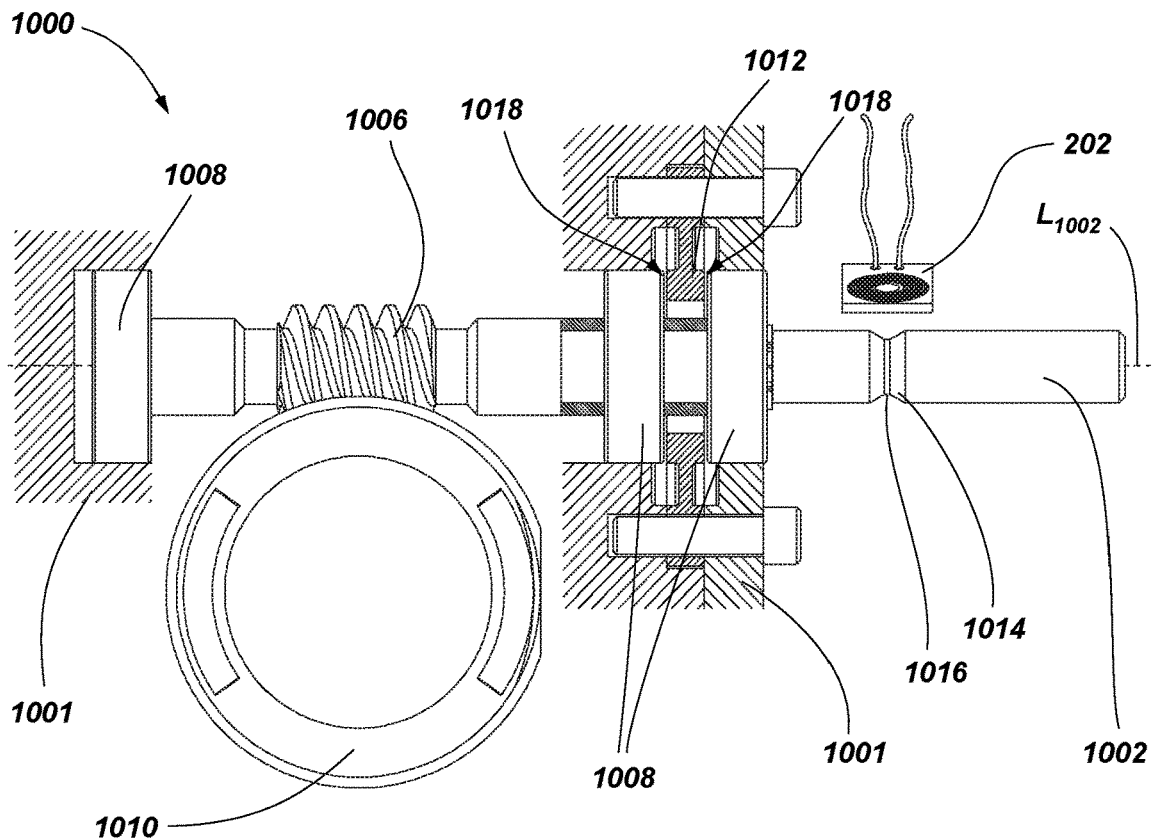
FIG. 11 is a partial cross-section view of a valve system including one or more LDC sensors utilized to sense one or more characteristics of a component of the valve system in accordance with an embodiment of the present disclosure.

FIG. 11 is a partial cross-section view of a valve system, for example, a portion of a valve actuator 1000, which may be somewhat similar to the valve actuators 100, 140 shown and described above with reference to FIGS. 1 and 2, respectively. As shown in FIG. 11, valve actuator 1000 may include one or more LDC sensors 202 configured to sense a characteristic (e.g., position) of one or more portions of a component (e.g., shaft 1002) of the valve actuator 1000. The sensed characteristic may then be utilized to determine at least one force (e.g., an axial force, an output torque) associated with or applied to the valve actuator 1000 (e.g., associated with or applied to the shaft 1002 and/or to one or more other components of the valve actuator 1000). While the embodiment of FIG. 11 is shown and described with reference to the shaft 1002 of the valve actuator 1000, in other embodiments, one or more LDC sensors may be utilized to measure one or more forces in other components of a valve system.

As depicted in FIG. 11, the LDC sensor 202 may be utilized to determine a force applied to or outputted from a component of a valve system by, for example, monitoring a position of the shaft 1002. For example, the LDC sensor 202 may monitor a position of the shaft along an axis of the shaft 1002 (e.g., a longitudinal axis $L_{1002}$ of the shaft 1002). In order to monitor the position of the shaft 1002, the LDC sensor 202 may sense conductive material or portion 1014 on the shaft 1002 e.g., an integral portion of the shaft 1002), which may be separate from or integral with the shaft 1002 and may be formed in any of the various configurations discussed hereinabove or below. For example, as depicted, the conductive material 1014 of the shaft 1002 may be formed in a valley configuration similar to that shown and described with reference to FIG. 8. However, as depicted, such a valley shape may be formed within a diameter of the shaft 1002 proximate the LDC sensor 202 rather than on the outer diameter of a shaft as shown in FIG. 8.

The LDC sensor 202 may be utilized to determine a force (e.g., torque) applied to the valve stem (e.g., valve stem 129 (FIG. 2)) that is coupled to and moved by a worm gear (e.g., worm gear 1010 of the valve assembly 1000, worm gear 110 of valve actuator 100). Shaft 1002 includes worm 1006 that is mated with worm gear 1010, similar to that discussed above with reference to FIG. 1. As also discussed above, shaft 1002 may be driven by a motor (e.g., motor 104 (FIG. 1)).

The shaft 1002 may be mounted (e.g., on one or more bearings 1008) in order to move along the longitudinal axis $L_{1002}$ of the shaft 1002. The shaft 1002 may be biased in an initial position (e.g., by a spring or other deformable member). For example, the shaft 1002 may be biased in the initial position by a deformable (e.g., primarily elastically deformable) plate 1012. For example, the shaft 1002 may extend through plate 1012 and bearings 1008 may be positioned on opposing sides of plate 1012 and may engage with plate 1012 when the shaft 1002 is moved along its longitudinal axis $L_{1002}$ in either direction.

Figure 12:
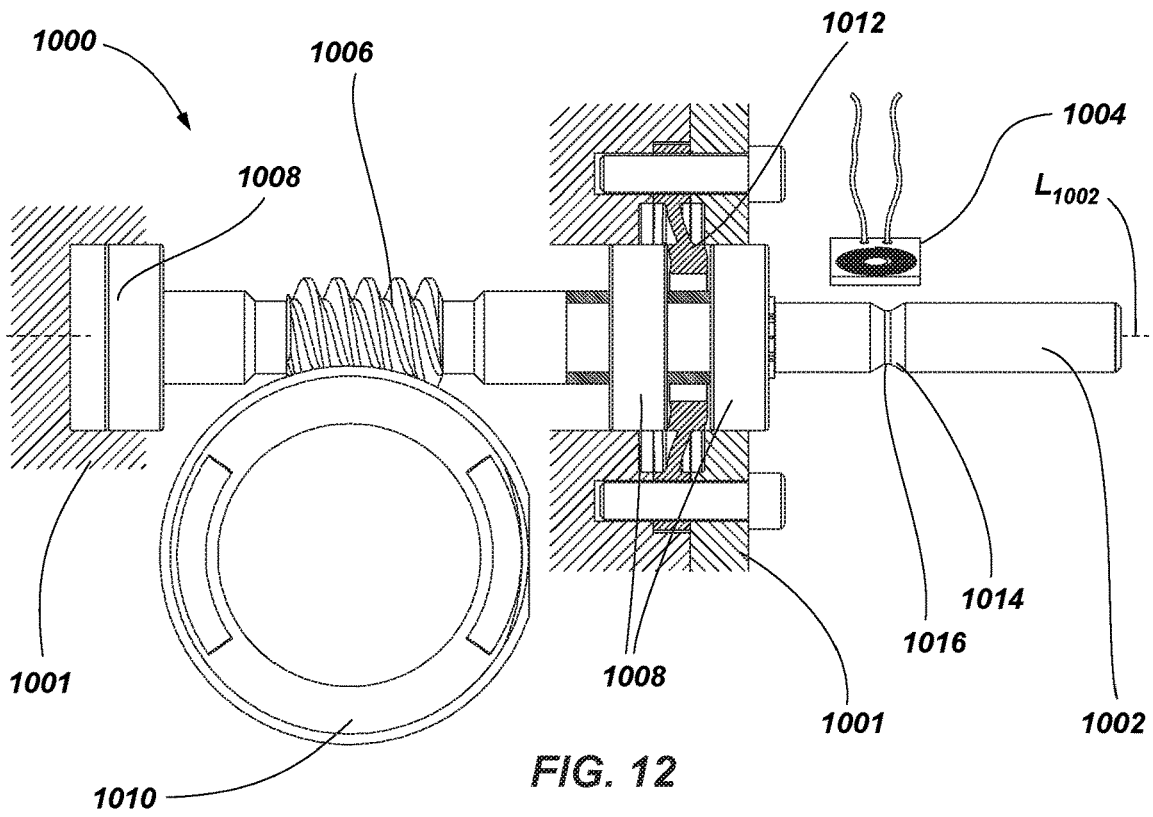
FIG. 12 is a partial cross-section view of the valve system of FIG. 11 shown in a displaced position.

FIG. 12 is a partial cross-section view of the shaft 1002 of the valve system of FIG. 11 shown in a displaced position. As shown in FIG. 12, as the shaft 1002 is rotated by the motor 104 (FIG. 1), the shaft 1002 with move along longitudinal axis $L_{1002}$ until a sufficient force is generated to begin moving the worm gear 1010 (and the valve stem 129 (FIG. 2) attached to the worm gear 1010). For example, such a sufficient force may be required to overcome any frictional or other forces tending to keep the valve stem 129 (FIG. 2) in an initial, stationary position. Movement of the shaft 1002 along longitudinal axis $L_{1002}$ will force a portion of the shaft 1002 (e.g., bearings 1008 that are slidably mounted within a housing 1001 of the valve actuator 1000) into contact with plate 1012 and may act to deform the plate 1012 that biases the shaft 1002 in an opposite direction along longitudinal axis $L_{1002}$. It will be appreciated that the shaft 1002 may also move in the opposite direction along longitudinal axis $L_{1002}$ in a similar manner based on the direction of rotation of the shaft 1002 by the motor 104 (FIG. 1).

In order to determine (e.g., calculate) the amount of force (e.g., torque) placed on the valve stem 129 (FIG. 2), the amount of displacement (e.g., translation) of the shaft 1002 from the initial position along longitudinal axis $L_{1002}$ be detected by the LDC sensor 202 by sensing the conductive material 1014 proximate the LDC sensor 202 and correlating the sensed value to a known or expected position of the conductive material 1014 and shaft 1002. The amount of displacement (x) relative to the initial position of the shaft 1002 may then be multiplied with a known stiffness or spring constant (k) of the plate 1012 to determine axial force (F) applied to the shaft 1002 (i.e., $F=k*x$). The axial force (F) may then be multiplied by the distance or radius (r) between the center of the worm gear 1010 and its point of contact on the shaft 1002 (e.g., at worm 1006) to calculate the torque ($\tau$) (e.g., output torque) (i.e., $\tau=F*r$).

In some embodiments, the conductive material or portion 1014 on the shaft 1002 may include a flat portion 1016 (e.g., a dwell at a bottom of the valley). Such a flat portion 1016 may enable compensation (e.g., play, backlash, tolerance) between the various components of the valve actuator 1000. For example, the flat portion 1016 may be positioned such that backlash (e.g., between worm 1006 and worm gear 1010) may move the conductive material or portion 1014 in the flat portion 1016 as to not substantially register movement of the conductive material 1014 with the LDC sensor 202. In other words, the flat portion 1016 is configured to not be substantially sensed by the LDC sensor 202 such that movement caused by backlash with not substantially register as a position change with the LDC sensor 202. In some embodiments, one or more gaps 1018 (e.g., having a width taken in a direction along longitudinal axis $L_{1002}$ similar to a width of the flat portion 1016 of the conductive material or portion 1014 of the shaft 1002) may be formed between the bearings 1008 and the plate 1012 to enable some movement or backlash in the shaft 102 without deforming the plate 1012.

Figure 13:
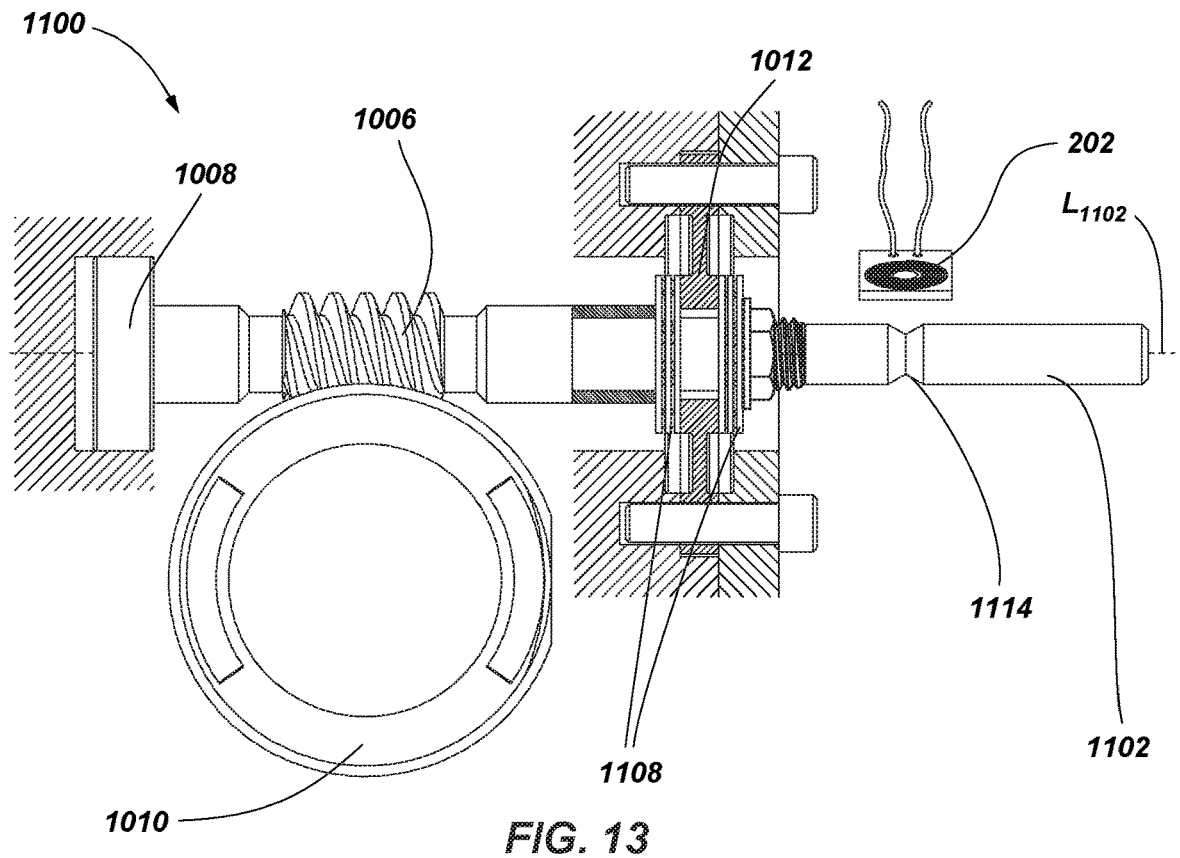
FIG. 13 is a partial cross-section view of a valve system including one or more LDC sensors utilized to sense one or more characteristics of a component of the valve system in accordance with an embodiment of the present disclosure.

FIG. 13 is a partial cross-section view of a valve system (e.g., a portion of a valve actuator 1100, which may be somewhat similar to the valve actuators 100, 140 shown and described above with reference to FIGS. 1 and 2, respectively. In some embodiments, valve actuator 1100 may be substantially similar to valve actuator 1000 discussed above in relation to FIGS. 11 and 12. However, as shown in FIG. 13, valve actuator 1100 may be formed to substantially (e.g., entirely) inhibit play in a longitudinal axis $L_{1002}$ of the shaft 1102 (e.g., without deforming the plate 1012). As depicted, the conductive material or portion 1114 of the shaft 1102 may also not include a flat portion. Such an embodiment may include one or more fixed bearings 1108 (e.g., thrust bearings fixedly coupled to the shaft 1102) configured to support an axial force or load.

Figure 14:
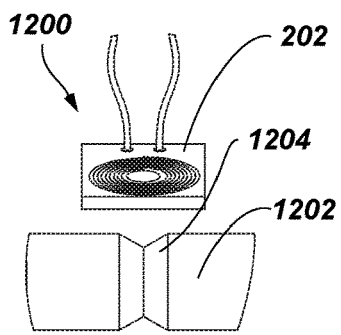
FIGS. 14 through 19 each show a partial view of a valve system including an LDC sensor utilized to sense one or more characteristics of a component of the valve system in accordance with an embodiment of the present disclosure.

FIG. 14 is a partial view of a valve system 1200 including a component of the valve system 1200 (e.g., a portion of a shaft 1202) and one or more LDC sensors 202 utilized to sense one or more characteristics of the shaft 1202 (e.g., in order to determine a force associated with the shaft 1202 and/or another component of the valve system 1200). In some embodiments, the shaft 1202 may be a rotating and/or linear displacing shaft, such as, for example, the worm shaft 103, 1002, 1102 (FIGS. 1, 11, 12, and 13), actuator stem 122 (FIG. 2), or the valve stem 129 (FIG. 2)). As depicted, the shaft 1202 may comprise one or more conductive materials or portions 1204 (e.g., formed at least partially within a diameter of the shaft 1204).

In order to determine the linear position of the shaft 1202 (or to further determine a characteristic (e.g., a force) of the shaft 1202 or another portion of the valve system based at least in part on the position of the shaft 1202), the conductive material 1204 may be designed to vary in thickness along the length of the shaft 1202 (e.g., along a longitudinal axis or centerline of the shaft 1202). For example, the conductive material 1204 may be formed to exhibit a gradated thickness with one or more peaks having an increased thickness in a radial direction of the shaft 1202 separated by valleys having a decreased thickness in a radial direction of the shaft 1202 (e.g., two peaks separated by a single valley). Such a configuration may enable the sensor 202 to detect linear position (e.g., translation) of the shaft 1202 as the shape (e.g., thickness) of the conductive material 1204 varies the portion (e.g., area, volume) of conductive material 1204 that is positioned proximate and sensed by LDC sensor 202 in order to correlate the data sensed by the LDC sensor 202 with known or expected positions of the shaft 1202 and conductive material 1204 utilizing the LDC sensors 202.

Figure 15:
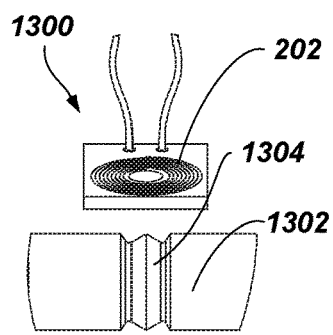

FIG. 15 is a partial view of a valve system 1300 including a component of the valve system 1300 (e.g., a portion of a shaft 1302) and one or more LDC sensors 202 utilized to sense one or more characteristics of the shaft 1302 (e.g., in order to determine a force associated with the shaft 1302 and/or another component of the valve system 1300). In some embodiments, the shaft 1302 may be a rotating and/or linear displacing shaft, such as, for example, the worm shaft 103, 1002, 1102 (FIGS. 1, 11, 12, and 13), actuator stem 122 (FIG. 2), or the valve stem 129 (FIG. 2)). As depicted, the shaft 1302 may comprise one or more conductive materials or portions 1304 (e.g., formed at least partially within a diameter of the shaft 1204).

In order to determine the linear position of the shaft 1302 (or to further determine a characteristic (e.g., a force) of the shaft 1302 or another portion of the valve system based at least in part on the position of the shaft 1302), the conductive material 1304 may be designed to vary in thickness along the length of the shaft 1302 (e.g., along a longitudinal axis or centerline of the shaft 1302). For example, the conductive material 1304 may be formed to exhibit a gradated thickness with one or more peaks having an increased thickness in a radial direction of the shaft 1302 separated by valleys having a decreased thickness in a radial direction of the shaft 1302 (e.g., two valleys separated by a single peak). Such a configuration may enable the sensor 1302 to detect linear position (e.g., translation) of the shaft 1302 as the shape (e.g., thickness) of the conductive material 1304 varies the portion (e.g., area, volume) of conductive material 1304 that is positioned proximate and sensed by LDC sensor 202 in order to correlate the data sensed by the LDC sensor 202 with known or expected positions of the shaft 1302 and conductive material 1304 utilizing the LDC sensors 202.

Figure 16:
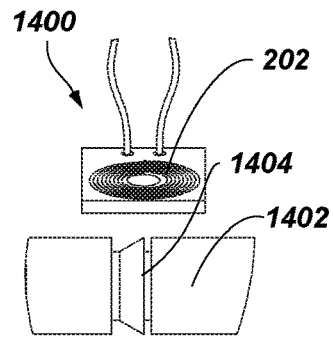

FIG. 16 is a partial view of a valve system 1400 including a component of the valve system 1400 (e.g., a portion of a shaft 1402) and one or more LDC sensors 202 utilized to sense one or more characteristics of the shaft 1402 (e.g., in order to determine a force associated with the shaft 1402 and/or another component of the valve system 1400). In some embodiments, the shaft 1402 may be a rotating and/or linear displacing shaft, such as, for example, the worm shaft 103, 1002, 1102 (FIGS. 1, 11, 12, and 14), actuator stem 122 (FIG. 2), or the valve stem 129 (FIG. 2)). As depicted, the shaft 1402 may comprise one or more conductive materials or portions 1404 (e.g., formed at least partially within a diameter of the shaft 1204).

In order to determine the linear position of the shaft 1402 (or to further determine a characteristic (e.g., a force) of the shaft 1402 or another portion of the valve system based at least in part on the position of the shaft 1402), the conductive material 1404 may be designed to vary in thickness along the length of the shaft 1402 (e.g., along a longitudinal axis or centerline of the shaft 1402). For example, the conductive material 1404 may be formed to exhibit a gradated thickness with one or more peaks having an increased thickness in a radial direction of the shaft 1402 separated by valleys having a decreased thickness in a radial direction of the shaft 1402 (e.g., a gradated thickness extending between one peak and one valley). Such a configuration may enable the sensor 1402 to detect linear position (e.g., translation) of the shaft 1402 as the shape (e.g., thickness) of the conductive material 1404 varies the portion (e.g., area, volume) of conductive material 1404 that is positioned proximate and sensed by LDC sensor 202 in order to correlate the data sensed by the LDC sensor 202 with known or expected positions of the shaft 1402 and conductive material 1404 utilizing the LDC sensors 202.

Figure 17:
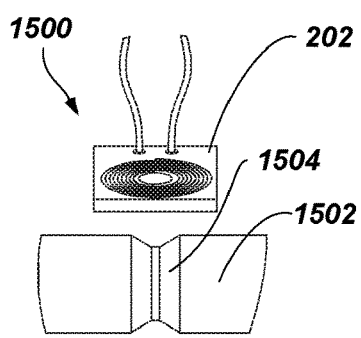

FIG. 17 is a partial view of a valve system 1500 including a component of the valve system 1500 (e.g., a portion of a shaft 1502) and one or more LDC sensors 202 utilized to sense one or more characteristics of the shaft 1502 (e.g., in order to determine a force associated with the shaft 1502 and/or another component of the valve system 1600). Valve system 1500 may be substantially similar to valve system 1200 discussed above with reference to FIG. 14. For example, conductive material 1504 of the shaft 1502 may be formed to exhibit a gradated thickness with one or more peaks having an increased thickness in a radial direction of the shaft 1502 separated by valleys having a decreased thickness in a radial direction of the shaft 1502 (e.g., two peaks separated by a single valley). Conductive material 1504 may further include at least one flat (e.g., formed at the bottom of the valley) to enable compensation (e.g., play, backlash) between the various components of the valve system 1500 without substantially detecting such compensation (e.g., movement of the shaft 1502) with the LDC sensor 202 in a similar manner to that as discussed above.

Figure 18:
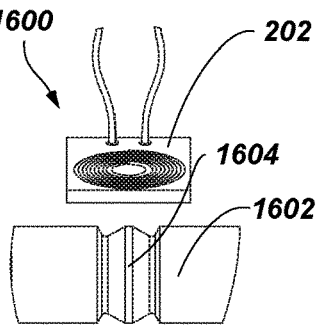

FIG. 18 is a partial view of a valve system 1600 including a component of the valve system 1600 (e.g., a portion of a shaft 1602) and one or more LDC sensors 202 utilized to sense one or more characteristics of the shaft 1602 (e.g., in order to determine a force associated with the shaft 1602 and/or another component of the valve system 1600). Valve system 1600 may be substantially similar to valve system 1300 discussed above with reference to FIG. 15. For example, conductive material 1604 of the shaft 1602 may be formed to exhibit a gradated thickness with one or more peaks having an increased thickness in a radial direction of the shaft 1602 separated by valleys having a decreased thickness in a radial direction of the shaft 1602 (e.g., two valleys separated by a single peak). Conductive material 1604 may further include at least one flat (e.g., formed at the apex of the peak) to enable compensation (e.g., play, backlash) between the various components of the valve system 1600 without substantially detecting such compensation with the LDC sensor 202 in a similar manner to that as discussed above.

Figure 19:
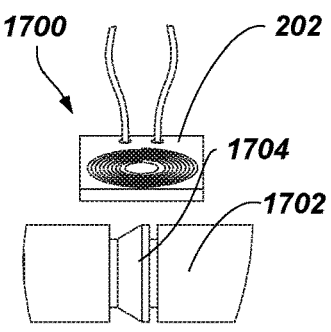

FIG. 19 is a partial view of a valve system 1700 including a component of the valve system 1700 (e.g., a portion of a shaft 1702) and one or more LDC sensors 202 utilized to sense one or more characteristics of the shaft 1702 (e.g., in order to determine a force associated with the shaft 1702 and/or another component of the valve system 1700). Valve system 1700 may be substantially similar to valve system 1400 discussed above with reference to FIG. 16. For example, conductive material 1704 of the shaft 1702 may be formed to exhibit a gradated thickness with one or more peaks having an increased thickness in a radial direction of the shaft 1702 separated by valleys having a decreased thickness in a radial direction of the shaft 1702 (e.g., a gradated thickness extending between one peak and one valley). Conductive material 1704 may further include at least one flat (e.g., formed at the apex of the peak) to enable compensation (e.g., play, backlash) between the various components of the valve system 1700 without substantially detecting such compensation with the LDC sensor 202 in a similar manner to that as discussed above.

While the sensing and/or determining of a force associated with one or more components of the valve system with the LDC sensors have been discussed primarily above in relation to the sensing of an axial force on a shaft and determined a resultant output torque based on the axial force, it will be understood that the present disclosure is not so limited. For example, LDC sensors and corresponding conductive materials may be utilized to sense a variety of forces associated with any suitable components of the valve system. By way of further example, the position of one or more conductive materials (e.g., linear strips of conductive material, individual conductive material positioned along a predetermined path) may be monitored by one or more LDC sensors to determine displacement and/or deformation of the conductive material that may be used to determine internal forces, stress, and/or strain in the components and/or deformation of the components. For example, necking, twisting, expansion, other deformation, frequency, and/or deviation from a known or expected path and/or location of the conductive materials may be utilized to determine values relating to the forces associated with the components of the valve system.

Embodiments of the present disclosure may be particularly useful in providing relatively low cost sensors that do not require the use of magnets or other relatively more expensive sensing technology. Such LDC sensors may enable the ability to directly sense forces associated with a valve system based on direct measurement of characteristics (e.g., position) of the by the LDC sensors as compared to convention indirect methods using voltage or amperage supplied to a motor or to relatively more complex mechanical systems used to directly measure such forces.

While certain embodiments have been described and shown in the accompanying drawings, such embodiments are merely illustrative and not restrictive of the scope of the disclosure, and this disclosure is not limited to the specific constructions and arrangements shown and described, since various other additions and modifications to, and deletions from, the described embodiments will be apparent to one of ordinary skill in the art. Thus, the scope of the disclosure is only limited by the literal language, and legal equivalents, of the claims that follow.

What is claimed is:

1. A method of determining a force associated with a valve system, the method comprising:
positioning at least one inductance-to-digital converter (LDC) sensor proximate a conductive material of an axially-moving shaft of the valve system, the conductive material of the axially-moving shaft comprising an irregular shape defined along an axis of the axially-moving shaft;
providing a dwell portion in the conductive material to compensate for at least one tolerance between components of the valve system;
wirelessly sensing a position of at least a portion of the conductive material with the at least one inductance-to-digital converter (LDC) sensor without use of magnets; and
determining a force associated with a portion of the valve system based at least partially on the position of the at least a portion of the conductive material sensed with the at least one inductance-to-digital converter (LDC) sensor.

2. The method according to claim 1, wherein positioning at least one inductance-to-digital converter (LDC) sensor proximate a conductive material of an axially-moving shaft of the valve system comprises positioning a conductive material of a worm shaft proximate the at least one inductance-to-digital converter (LDC) sensor.

3. The method according to claim 2, further comprising biasing the worm shaft in a first position with a biasing element.

4. The method according to claim 3, wherein determining a force associated with a portion of the valve system based at least partially on the position of the at least a portion of the conductive material comprises determining an output torque associated with a valve actuator of the valve system based at least partially on the position of the at least a portion of the conductive material sensed with the at least one inductance-to-digital converter (LDC) sensor and a known stiffness of the biasing element.

5. The method according to claim 2, further comprising providing the dwell portion in the conductive material to at least partially compensate for a backlash of the worm shaft.

6. The method according to claim 1, further comprising comparing the position of the at least a portion of the conductive material to a known position of the conductive material to determine a deviation of the position of the at least a portion of the conductive material from the known position.

7. The method according to claim 1, further comprising biasing the axially-moving shaft in a first position with a biasing element and wherein determining a force applied to a portion of the valve system based at least partially on the position of the at least a portion of the conductive material comprises determining a force associated with the axially-moving shaft based at least partially on the position of the at least a portion of the conductive material sensed with the at least one inductance-to-digital converter (LDC) sensor and a known stiffness of the biasing element.

8. The method according to claim 1, wherein the at least one LDC sensor comprises an inductor and is configured to sense a position of at least a portion of a conductive material wirelessly, and wherein the valve system is configured to determine at least one force applied to a portion of the valve system based at least partially on the position of the at least a portion of the conductive material sensed with the at least one LDC sensor.

9. The method according to claim 8, wherein the conductive material varies in thickness along a length of the shaft.

10. The method according to claim 1, further comprising selecting the valve system to comprise:
- a biasing element comprising a plate, wherein the shaft extends through the plate and is configured to engage and deform the plate on opposing sides of the plate, wherein bearings coupled to the shaft are configured to engage and deform the plate on opposing sides of the plate;
- at least one gap formed between the plate and a corresponding bearing on at least one side of the plate;
- a flat portion on the conductive material having a dimension substantially equal to the at least one gap formed between the plate and a corresponding bearing on at least one side of the plate; and
- at least one inductance-to-digital converter (LDC) sensor separated from the at least one conductive material of the at least one component.

11. The method according to claim 1, further comprising sensing the conductive material comprising an integral portion of the shaft.

12. The method according to claim 1, further comprising sensing the conductive material comprising additional material formed over the shaft.

13. The method according to claim 1, further comprising determining an output torque applied to the shaft based at least partially on the position of the at least a portion of the conductive material and a stiffness of a biasing element biasing the shaft.

14. The method according to claim 1, further comprising rotating the shaft with a motor.

15. The method according to claim 1, further comprising displacing the shaft through a biasing element while at least partially deforming the biasing element.

16. A method of determining a force associated with a valve system, the method comprising:
- positioning at least one inductance-to-digital converter (LDC) sensor proximate a conductive material of a component of the valve system;
- wirelessly sensing a position of at least a portion of the conductive material with the at least one inductance-to-digital converter (LDC) sensor;
- determining a force associated with a portion of the valve system based at least partially on the position of the at least a portion of the conductive material sensed with the at least one inductance-to-digital converter (LDC) sensor; and
- providing a dwell portion in the conductive material to at least one of compensate for at least one tolerance between components of the valve system or at least partially compensate for a backlash of the component of the valve system.

17. The method according to claim 16, wherein positioning at least one inductance-to-digital converter (LDC) sensor proximate a conductive material of a component of the valve system comprises positioning a conductive material of a worm shaft proximate the at least one inductance-to-digital converter (LDC) sensor.

18. A method of determining a force associated with a valve system, the method comprising:
- positioning at least one inductance-to-digital converter (LDC) sensor proximate a conductive material on a shaft of the valve system;
- wirelessly sensing a position of at least a portion of the conductive material with the at least one inductance-to-digital converter (LDC) sensor;
- defining at least one gap defined between a portion of the shaft and a biasing element such that movement caused by backlash will not substantially register as a position change with the at least one inductance-to-digital converter (LDC) sensor;
- displacing the shaft through the biasing element while at least partially deforming the biasing element; and
- determining a force associated with a portion of the valve system based at least partially on the position of the at least a portion of the conductive material sensed with the at least one inductance-to-digital converter (LDC) sensor and a known stiffness of the biasing element.

19. The method according to claim 18, further comprising detecting the conductive material positioned on an axial end of the shaft that extends through the biasing element.

* * * * *